TRANSISTOR FAVORITE STATION SIGNAL SEEKING TUNED RADIO

Filed Nov. 13, 1956

3 Sheets-Sheet 1

INVENTORS
James H. Guyton,
Clarence J. Vokava,
Richard L. Jenkins, &
David W. Dodge
BY R. C. Fowler
ATTORNEY

TRANSISTOR FAVORITE STATION SIGNAL SEEKING TUNED RADIO

Filed Nov. 13, 1956 3 Sheets-Sheet 2

INVENTORS
James H. Guyton,
Clarence J. Vokava,
Richard L. Jenkins, &
David W. Dodge
BY R. E. Fowler
ATTORNEY

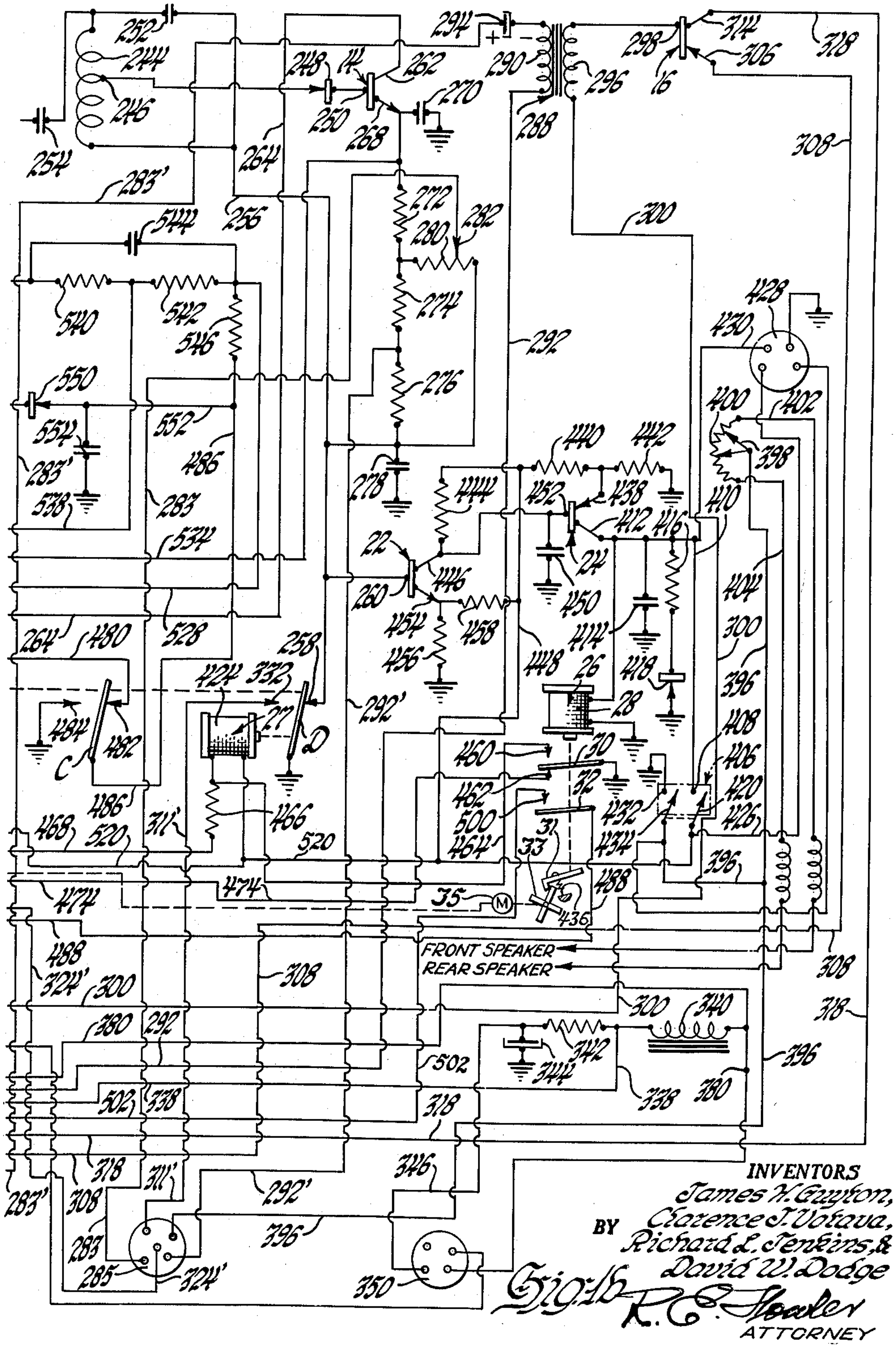
INVENTORS
James H. Guyton,
Clarence J. Votava,
Richard L. Jenkins, &
David W. Dodge
BY
R. C. Fowler
ATTORNEY 2,981,836

TRANSISTOR FAVORITE STATION SIGNAL SEEKING TUNED RADIO

James H. Guyton, Clarence J. Votava, Richard L. Jenkins, and David W. Dodge, Kokomo, Ind., assignors to General Motors Corporation, Detroit, Mich., a corporation of Delaware Filed Nov. 13, 1956, Ser. No. 621,948

7 Claims. (Cl. 250—20)

This invention relates to radio receiving apparatus and more particularly to radio receiving apparatus utilizing semi-conductor devices or transistors as amplifying and detecting means and for control purposes. Conventional radio receiving apparatus has utilized, in the past, electron tubes for amplifying and detecting purposes and these have required relatively high voltages for supplying some of the tube elements. In installations on automotive vehicles where the electrical source of power is a low voltage storage battery, this has necessitated the use of a power supply section for transforming the low voltage power to higher voltages to supply the tube electrodes. The power pack or power supply section is an expensive component of the receiver. In addition, it requires a relatively high current and therefore introduces a substantial current drain on the battery. The advent of transistors into the field for use as amplifying and detecting means is of particular interest in the design of radio receiving apparatus for use in automotive vehicles for several reasons. In the first place, transistors operate on low voltages, such as those produced by current storage batteries. This eliminates the necessity for a power supply unit with its attendant cost, weight and noise since they include vibrators. Secondly, transistors only require a very small current and therefore the current drain on the power source (battery) is low. Lastly, transistors are small in size and since in any automobile equipment, size and space are important, this is also an important factor in their use.

It is an object in making this invention to provide a complete radio receiver utilizing transistors as amplifying and detecting means.

It is a further object in making this invention to provide a transistorized radio receiver of the signal-seeking or stop-on-signal tuning type.

It is a further object in making this invention to provide a favorite station selector system with signal-seeking tuning means in a transistorized radio receiver.

It is a still further object in making this invention to provide a low-voltage radio receiver of the signal-seeking tuning type.

Figure 1:
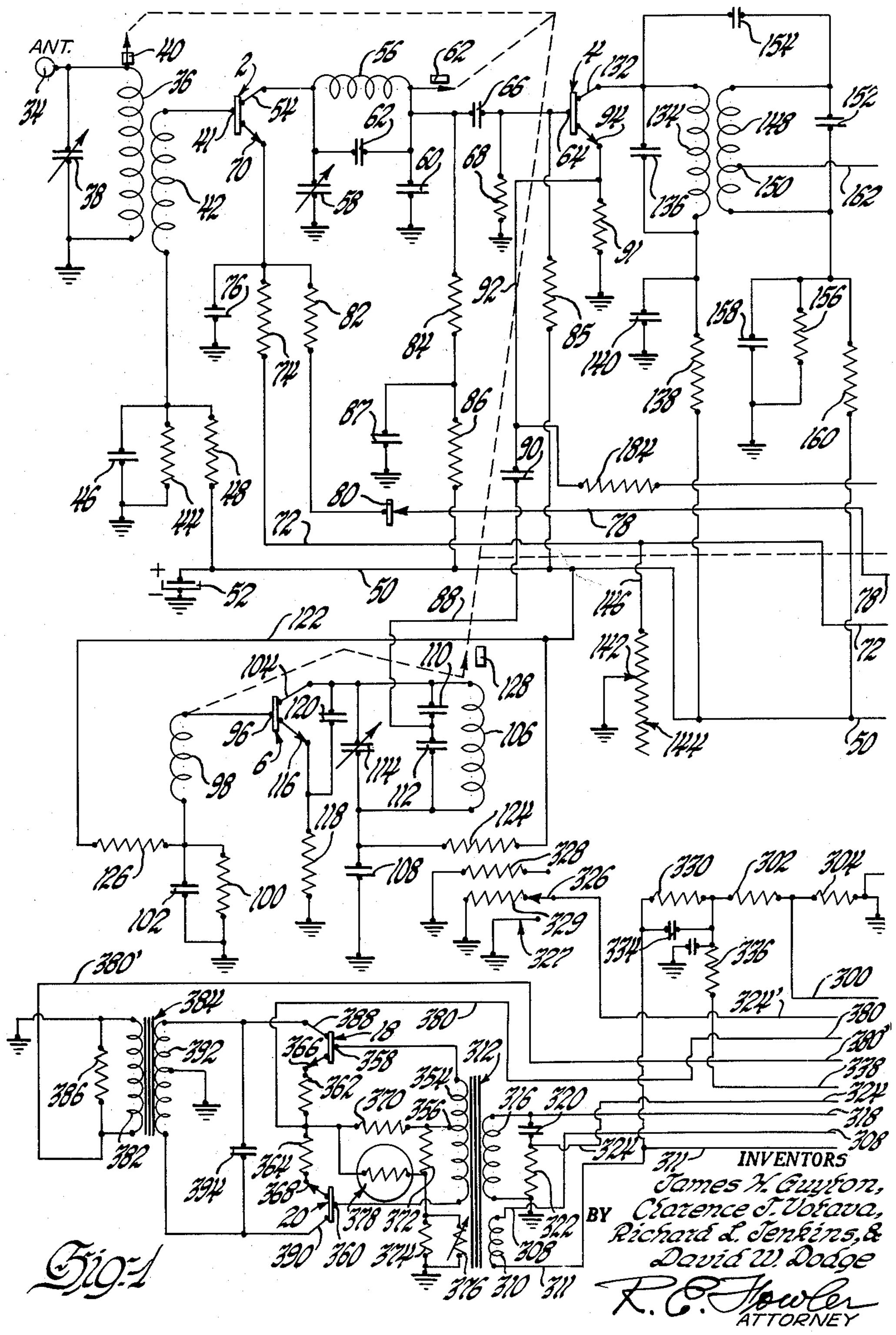
Figure 1A:
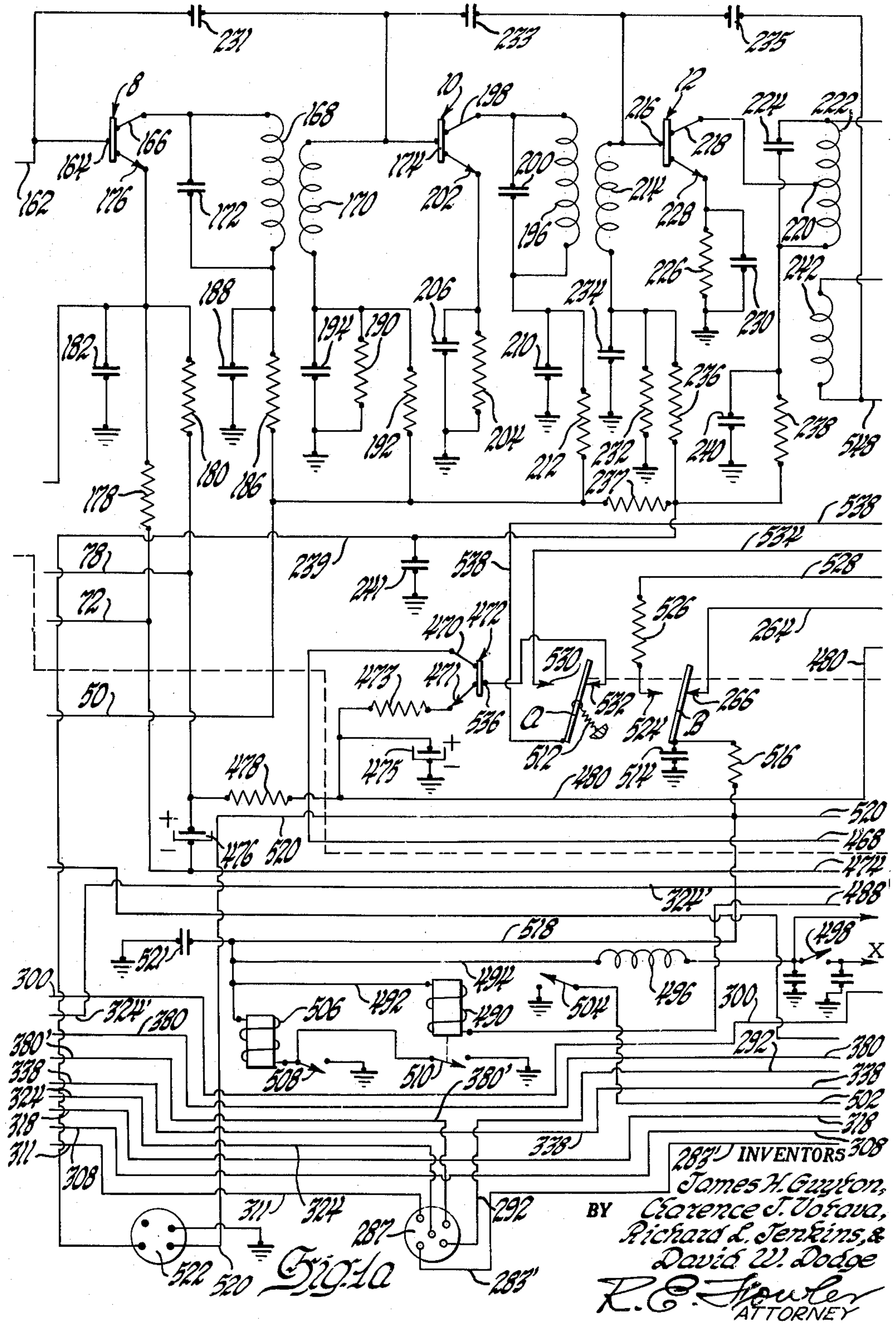

With these and other objects in view, which will become apparent as the specification proceeds, our invention will be best understood by reference to the following specification and claims and the illustrations in the accompanying drawings, in which:

Figs. 1, 1*a* and 1*b* all form unitary parts of a complete circuit diagram of a radio receiver embodying my invention; Fig. 1 disclosing the antenna, radio frequency amplifier, oscillator, mixer and final audio output stages of the receiver; Fig. 1*a*, the three IF amplifier stages; and Fig. 1*b*, the detector, first audio and trigger indexing control circuits.

The figures of the drawing, when placed with Fig. 1 at the left; Fig. 1*a* in the center and Fig. 1*b* at the right, provide the complete circuit diagram.

In general, the receiver is of the superheterodyne type and consists of one radio frequency amplifier stage including transistor 2, which receives high frequency radio energy from the antenna, amplifies it and passes it on to the mixer stage which includes transistor 4. At this point the radio frequency energy received from the transmitter is mixed with the locally generated frequency from the oscillator stage which includes transistor 6 and the resultant beat frequency, which is the intermediate frequency, is fed through three IF amplifier stages which include transistors 8, 10 and 12. To the output of the last IF stage there is connected a detector, which includes a transistor 14 to detect the received signal and the output of the detector is applied to a first audio frequency amplifier driver stage including transistor 16 and thence through a push-pull audio output stage including two transistors 18 and 20 which feed the loud speaker.

There are also provided in this receiving system, means for producing an indexing or stopping pulse which is connected to the coupling between the last IF amplifier and detector. This triggering circuit likewise is a two-stage circuit including two transistors 22 and 24. When a station is tuned in a control relay is deenergized to simultaneously actuate a second relay to switch a plurality of control switch arms to one position and also to drop a mechanical detent in the path of a moving part to index the tuning means accurately on that station. This sensitive control relay is shown at 26 and includes an operating coil 28 which moves a pair of spaced armatures 30 and 32 which are connected to move together mechanically but are electrically insulated from each other to control two separate circuits. With this general explanation, the drawings will be referred to more specifically.

In Figure 1, there is a shown a contact 34 which is adapted to be connected to the antenna and to receive transmitted signals therefrom. Contact 34 is connected directly to one terminal of the primary 36 of an RF coupling transformer, the opposite terminal of which is grounded. An adjustable condenser 38 is connected across the primary 36 to provide a resonant circuit. To tune the resonant circuit thus provided over a desired frequency band, a comminuted iron core is provided which is diagrammatically illustrated at 40 and is adapted to be inserted within and withdrawn from the coil 36 to tune the receiver over the prescribed band. A secondary coil 42 is inductively coupled with the tuning coil 36 has one terminal connected directly to the base 41 of the transistor 2 and the other terminal connected through a resistor 44 to ground. The secondary winding 42 is wound on the high frequency end of the primary coil 36 to adjust the impedance of the transformer to tend to compensate for the inherent sensitivity changes in the associated transistor as it tunes over the frequency band. The low end of secondary 42 is connected to base bias network of resistor 44 to ground and resistor 48 connected to power line 50. A condenser 46 is connected in shunt with resistor 44. A second bypass condenser 52 is connected between line 50 and ground to act as an audio radio frequency shunt.

Transistor 2, as previously indicated, is adapted to amplify the radio frequency signal applied from the antenna and its collector electrode 54 is connected to an image suppression circuit including coil 56, both ends of which are bypassed to ground through condensers 58 and 60, respectively. A further condenser 62 is connected in shunt with the coil 56. Condenser 58 is made adjustable for factory adjustment purposes. In order to tune the coupling circuit between the radio frequency stage and the mixer stage, a second comminuted iron coil 62 is provided which is adapted to be inserted within and withdrawn from coil 56 simultaneously with similar movement of tuning core 40. This simultaneous movement is indicated by the dashed lines connecting the cores 40 and 62. The output of the image suppression and tuning stages 56, 58, 60 and 62 is applied to the base electrode 64 of transistor 4 through a coupling condenser 66. A biasing resistor 68 is connected between the base 64 and ground.

The emitter electrode 70 of the transistor 2 is connected to a ground potential through line 72 through a limiting resistor 74 connected between line 72 and the emitter electrode 70. A bypass condenser 76 is connected between emitter 70 and ground. An automatic gain control or feedback line 78 is connected through a delaying diode rectifier 80 and a limiting resistor 82 to the emitter electrode 70 of the transistor 2. The right-hand end of the image suppression section is connected to line 50 through a filter which includes two resistances 84 and 86 in series, a central point between these two resistances being connected to ground through a fourth bypass condenser 87. The base 64 of transistor 4 is connected to line 50 through biasing resistor 85.

The signal applied to the base 64 of the transistor 4 is adapted to be mixed with the locally generated frequency produced by the local oscillator and this locally generated signal is applied to line 88 and through a coupling condenser 90 to tie line 92 connected to the emitter electrode 94 of the transistor 4. A biasing resistor 91 is connected between line 92 and ground. This locally generated frequency is produced by the oscillatory circuit associated with transistor 6 in the lower central section of Figure 1. The base 96 of transistor 6 is connected to one terminal of an induction coil 98, the other terminal of which is connected to base bias network of resistor 100 to ground and resistor 126 connected to power line 122. A condenser 102 is connected in shunt with the resistance 100. The collector electrode 104 of the transistor 6 is connected to one terminal of an output coupling coil 106, the other terminal of which is connected to ground through a bypass condenser 108. Two condensers 110 and 112 are connected in series across the coil 106. A further variable condenser 114 is connected in shunt across the coil 106. The emitter electrode 116 is connected through biasing resistor 118 to ground and a further condenser 120 is connected across between the collector electrode 104 and the emitter electrode 116.

Power is applied to the oscillator through line 122 connected through limiting resistor 124 to one terminal of the output coil 106 and in a similar manner through limiting resistor 126 to one terminal of the input coil 98. Coils 98 and 106 are mounted in juxtaposition so that there is a mutual inductance coupling. This is indicated by the dashed line extending between the two. Furthermore, this oscillator section is tuned by a third comminuted iron core indicated diagrammatically at 128 which likewise is simultaneously moved with the first two mentioned cores 40 and 62, all of these elements being interconnected by dashed lines to indicate their common simultaneous tuning movement for receiver tuning. This oscillator circuit is very stable in frequency with variations in supply voltage since collector voltage changes are compensated by simultaneous emitter-base voltage changes, and since the transistor 6 is operated at relatively high emitter-base current and collector-emitter capacitance changes are minimized by parallel capacity 120. Upon an application of power to line 122, the oscillatory circuit whose frequency is determined by the resonant circuit consisting of coil 106, condensers 110, 112 and 114 begins to oscillate. The output is coupled back to the input through the mutual inductance of coils 106 and 98 to maintain oscillation. The output of the oscillator is tapped off at a point in the capacity divider intermediate condensers 110 and 112 and applied through line 88 and condenser 90 to the emitter electrode 94 of transistor 4. This reduces the loading of the oscillator by the mixing stage. At this point, therefore, the two frequencies, one received from the transmitting station and the other locally generated, are mixed to produce a difference frequency in the output of transistor 4.

This is defined as an intermediate frequency and appears on collector electrode 132 of transistor 4. This electrode is connected directly to one terminal of a primary 134 of a first IF coupling transformer which is tuned to the resonant intermediate frequency by a condenser 136 connected across said primary. The other terminal of the primary 134 is connected through filter resistance 138 with power supply line 50. A bypass condenser 140 is connected to the lower terminal of primary 134 and to ground to bypass high frequency currents. A search sensitivity control is connected to the high frequency amplifying portion of the receiver. Normally it is shorted to ground by relay contact 462. It consists of a variable tap 142 which moves over the surface of a resistor 144, said tap being grounded. One terminal of the resistor 144 is connected through line 146 with line 72 which extends to emitter electrodes 70 and 176 of transistors 2 and 8 respectively and to relay contact 462 through line 474. By thus varying emitter bias during search the sensitivity of the amplifier is changed to provide for varying stopping sensitivity levels.

The secondary 148 of the first IF transformer is mounted in juxtaposition to the primary 134 but not magnetically coupled thereto and has a tap 150. A condenser 152 is connected across the secondary 148 to tune the secondary to the resonant IF frequency. A coupling condenser 154 is connected across the upper terminals of the primary and secondary windings to couple the two as there is no inductive coupling. The lower terminal of the secondary winding 148 is connected to ground through biasing resistor 156 and bypass condenser 158 in shunt relation thereto. This terminal is also connected through a limiting resistor 160 to power supply line 50. The intermediate tap 150 of the secondary 148 is connected through line 162 to the base 164 of the first IF amplifier stage including transistor 8. This applies the amplified IF signal to this amplifier stage. The collector 166 of the transistor 8 is connected to a primary 168 of the second IF transformer having a secondary 170. This second IF transformer coupling has a tuned primary but an untuned secondary circuit. A condenser 172 is connected across the primary 168 to tune that to the resonant IF frequency but the untuned secondary 170 is directly connected to the base electrode 174 of the next transistor 10. The emitter electrode 176 of the transistor 8 is connected to the line 72 through a biasing resistor 178. Emitter 176 is likewise connected through resistor 180 with the AGC line 78. Completing the circuit for the emitter electrode 176 is a bypass condenser 182 connected between the emitter electrode and ground. A limiting resistor 184 is connected between emitters 94 and 176 of the transistors 4 and 8, respectively.

The lower terminal of the primary 168 is connected through a filter resistor 186 to supply line 50 to supply power to the collector electrode 166. A bypass condenser 188 s connected between the lower terminal of the primary 168 and ground. As previously mentioned, the secondary 170 of this IF transformer is untuned and the upper terminal connected directly to the base electrode 174 of transistor 10. The lower terminal of the secondary 170 is connected directly through biasing resistor 190 to ground and through limiting resistor 192 to the power supply line 50. A bypass condenser 194 is connected in shunt to the biasing resistor 190. The second IF amplifier stage, including transistor 10, feeds into a third IF transformer. Again this circuit includes a tuned primary and an untuned secondary. The primary winding 196 of the transformer has one terminal connected to the collector electrode 198 of the transistor 10 and a condenser 200 connected across said primary 196 tunes the circuit to the IF frequency. The emitter electrode 202 of the transistor 10 is connected to ground through biasing resistor 204 shunted by bypass condenser 206.

The lower terminal of the primary 196 of this transformer is connected to ground through bypass condenser 210 and also through a limiting resistor 212 to the power supply line 50. The untuned secondary 214 of this third IF transformer has its upper terminal connected directly to the base 216 of the transistor 12 included in the last IF frequency amplifier stage. The collector electrode 218 of the transistor 12 is connected to a tap 220 on the primary 222 of the last IF transformer which feeds the detector stage. A condenser 224 is connected across the primary 222 to tune it to the IF frequency. A resistance 226 is connected between the emitter electrode 228 of the transistor 12 and ground, said resistor 226 being shunted by a bypass condenser 230.

Transistor 12 is operated at a much higher emitter current than the other IF stages in order to increase the available IF power to supply the automatic gain control, the audio detection section and the signal seeking indexing circuits. The lower terminal of the secondary 214 in the input to transistor 12 is connected to ground through biasing resistor 232 shunted by condenser 234 and also through series limiting resistor 236 to supply line 239. The lower terminal of primary 222 of the last IF transformer is connected to ground through condenser 240 and to supply line 239 through resistor 238. Filter resistor 237 is connected between lines 50 and 239. Power line 239 extends to one terminal on the disconnect plug 522. A condenser 241 is connected between line 239 and ground. Neutralizing condensers 231 and 233 are connected between transistor bases 164 and 174 and 174 and 216 respectively. A third condenser 235 is connected between base 216 and the lower end of secondary coil 242. These three amplifying stages merely amplify the IF currents and produce on the primary 222 of the last stage an output signal for detecting and control purposes.

The last IF transformer has two secondary windings 242 and 244. Secondary 242 is inductively coupled to primary 222 but secondary 244 has no inductive coupling but is capacity coupled as will be described. The latter secondary is that winding used to apply the signal to the detector. It has a tap terminal 246 which is connected directly through a diode rectifier 248 to the base 250 of the detector transistor 14. The diode 248 is utilized to minimize the detuning of the last IF transformer consisting of winding 244 and condenser 252 with change of magnitude of signal input and changes of load between search and listen conditions. It accomplishes this by minimizing the effect of variations in capacity of the transistor 14 when acting as a diode during search conditions and when acting as a transistor detector during listening conditions due to variations in signal magnitude. The input capacity of the transistor-detector 14 increases with increase in magnitude of signal level. This change in capacity is reflected back into tuned circuit 244—252. It will tend to de-tune this resonant circuit. The interposition of diode 248 inserts a smaller capacity between the resonant circuit and the transistor-detector which reduces the effect of the capacity change in the transistor on said resonant circuit so that it will not be detuned. A condenser 252 is connected directly across the secondary 244 to tune it to the resonant IF frequency. A coupling condenser 254 is connected between the upper terminals of the primary 222 and the secondary 244 to provide a capacity coupling between the two. The lower terminal of the secondary 244 is connected through conductor 256 with a stationary contact 258 of a multi-pole, multi-position control switch 27 to be described. It is also connected to the base electrode 260 of the transistor 22 which forms the first stage of the trigger control stopping or indexing circuit.

The collector electrode 262 of the detector transistor 14 is connected through line 264 with stationary contact 266 of another section of the multi-pole, multi-position control switch to supply voltage thereto. The emitter electrode 268 of the detector transistor 14 is connected to ground through a high frequency bypass condenser 270 and also to one end of a plurality of resistors 272, 274 and 276 connected in series relation forming a potential divider. The remote end of the series of resistances is connected directly to line 256 and also to ground through condenser 278. It is across this potentiometer formed of these resistors that the control and detected signals are developed. A resistance 280 for volume control purposes has one terminal connected to a point between resistors 272 and 274 and its other terminal connected directly to line 256. A variable tap 282 on said resistance 280 is adapted to be moved over the surface of this resistance and to provide volume control for the receiver inasmuch as this variable tap is connected through line 283 to the audio output. Line 283 extends to disconnect plug 285 which mates with socket 287 and matching line 283′ in turn is connected to one terminal of primary 290 of coupling transformer 288 through condenser 294. The coupling transformer 288 couples the output of the detector into the first audio frequency amplifier stage. The outer terminal of the transformer primary 290 is connected by line 292 to socket 287 and thence through matching line 292′ from the mating plug 285 to a point intermediate resistances 274 and 276.

The secondary 296 of the coupling transformer 288 has one terminal connected directly to the base 298 of the transistor 16 and the other terminal connected through conductor 300 with an intermediate point in a voltage divider between resistors 302 and 304 to be described (see Fig. 1). The emitter electrode 306 of the audio amplifier 16 is connected directly through conductor 308 with one terminal of one of the secondary windings 310 of the coupling transformer 312 for the push-pull audio output amplifier stage including transistors 18 and 20. The collector electrode 314 of the transistor 16 is connected directly to one terminal of the other secondary winding 316 through conductor 318. The opposite terminal of the secondary winding 316 is connected directly to ground and a condenser 320 in series with a resistance 322 is connected across said secondary winding 316. An intermediate tap between condenser 320 and resistance 322 is connected through conductor 324 to a tone control switch arm 326 through socket 287, mating plug 285 and line 324′. The arm 326 is adapted to engage a plurality of stationary contacts connecting different resistances 328 and 329 and direct ground contact 327 between this arm 326 and ground.

The second terminal of the secondary coil 310 is connected through line 311 to the top end of a potentiometer formed of the three resistances 330, 302 and 304 in series. As previously mentioned, the point intermediate resistances 302 and 304 is connected through line 300 and secondary 296 to base 298 of the audio driver stage. Line 311 is also connected to socket 287 and corresponding line 311′ from the mating plug 285 extends to stationary contact 332 of the multi-pole control switch 27. A condenser 334 is connected across the resistance 330. The point intermediate resistances 330 and 302 is connected through resistance 336 to line 338. Line 338 extends to a filter section in the power supply including a choke coil 340, resistance 342 and a condenser 344. Line 338 is connected to a point intermediate the choke coil 340 and the resistor 342. The remaining terminal of the resistor 342 is connected through line 346 to a disconnect socket 350 and also to ground through condenser 344. The mating terminal in plug 522 is connected to line 239 previously described. The remaining terminal of the choke coil 340 is likewise connected through line 380 to another terminal of the socket 350 whose mating terminal in plug 522 is connected to power line 520. This completes the input circuit to coupling transformer 312 between the first audio driver stage and the push-pull audio output including transistors 18 and 20.

The secondary 354 of the transformer 312 has a center tap 356. One outside terminal of the secondary 354 is connected directly to base 358 of the transistor 18 and the opposite external terminal to the base 360 of the transistor 20. Two resistances 362 and 364 are connected together in series relation between emitter electrode 366 of the transistor 18 and emitter electrode 368 of the transistor 20. A point intermediate the resistances 364 and 362 is connected to the center tap 356 of the secondary 354 through a resistance 370. The center tap 356 is likewise connected to ground through a voltage divider consisting of resistance 372 in series with resistance 374. A variable resistance 376 is connected in shunt around resistance 374 and is used for adjustment purposes. A thermistor 378 is connected between one terminal of the resistance 370 and a point intermediate the resistors 372 and 374 in order to stabilize the operation of the system and correct for temperature changes. The point intermediate the resistances 362 and 364 is in addition connected through conductive line 380 with one terminal of the disconnect socket 350, the mating contact of the plug 522 being connected to power line 520. One terminal of the secondary 382 of the audio output transformer 384 is connected through line 380′ with a contact on socket 287, the mating plug 285 having its matching terminal connected through line 396 to the fader volume control 398. The other terminal of the secondary 382 is connected to ground and a resistor 386 is directly connected across said secondary. The collector electrodes 388 and 390 of transistors 18 and 20 respectively are connected to opposite terminals of the primary 392 of the transformer 384. The center tap of this transformer is connected to ground. A condenser 394 is connected across the primary winding 392.

The output of the audio transformer 384 is, as previously indicated, fed to the various speaker systems through line 380′, disconnect plug 287—285 and line 396 to a variably positioned fader tap 398 which is movable over a resistor 400. One end of the resistance 400 is connected through line 402 with the front speaker and the opposite end of the resistor 400 is connected through line 404 with the rear speaker, both being indicated by printed labels on Figure 1*b*. Thus as the arm 398 is moved over the surface of resistor 400 the signals are impressed in differing degrees on the two speakers.

The radio receiving system herein described, is designed to be indexed or controlled by a signal seeking portion or stop-on-signal control system. Briefly, this type of control is, in general, the type that has been used in electron tube receivers such as that shown in U.S. patent to Guyton 2,652,494 dated Sept. 15, 1953 entitled Signal Seeking Tuners. As previously mentioned, the stopping signal in the current system is provided by a two-stage amplifier section including transistors 22 and 24. In order to start the signal tuning device scanning, it is necessary in this type of tuner to energize a control coil which releases mechanical driving means to cause the tuner to scan across the band. Such a driving means as a loaded spring many be provided as shown in U.S. patent to Schwarz 2,701,330. A power storage means such, for example, as a loaded spring is used to pull the tuning means in one direction over the frequency band and limit switches control an electric solenoid which recocks the spring to quickly move the tuning means to the opposite end of the band when one scanning cycle is completed. In the present circuit, therefore, there is shown a manually controlled double pole, single throw, momentarily actuated, biased switch 406. This switch is adapted when closed to complete an initial energizing circuit to the relay coil 28 of relay 26. Stationary terminal 408 of the switch 406 is connected through line 410 to one terminal of the winding 28. Line 410 is likewise connected directly to collector electrode 412 of the transistor 24. A filter condenser 414 is connected between line 410 and ground and a second circuit including resistance 416 and rectifier 418 is likewise connected between line 410 and ground the purpose of which is to protect transistor 24 by providing a path to ground for the energy contained in the field winding 28 as it collapses upon deenergization of the relay. Movable contact arm 420 of the switch 406 is connected through line 520, line 518, line 494 and choke 496, to the power supply. Line 520 is likewise connected to one terminal of the multi-pole control switch operating coil 424. Movable switch arm 420 is likewise connected through line 426 to one terminal of a disconnect plug 428 which extends to a foot-operated control switch when so desired. Line 410 is also connected through tie line 430 to another terminal of the disconnect plug 428. The manual switch 406 likewise has a second stationary contact 432 which is grounded and a second ganged movable switch arm 434 which moves simultaneously with any movement of movable arm 420. Arm 434 is directly connected through line 396 with a terminal on plug 285. The mating terminal on socket 287 is connected through line 380′ to one side of the secondary 382 of the audio output transformer 384.

During the searching periods, at which time the relay coil 28 is energized, the armatures 30 and 32 are pulled upwardly against the bias of a spring 436. This action also lifts a detent from mechanical engagement with a part of the equipment and permits the tuner to be moved slowly over the band. In order to initially energize coil 28 to start such scanning action, the operator closes the manual switch 406. However this is only a momentary action and the operator may then remove pressure from the switch causing it to open. From that point on until another station signal is reached, sufficient current flows through transistor 24 and coil 28 to maintain energization of relay 26. The emitter electrode 438 of the transistor 24 is connected to a point intermediate resistors 440 and 442, one end of the latter being grounded and the remaining end of resistor 440 being connected to a third resistor 444 which is in turn connected to the collector electrode 446 of the preceding transistor 22. A point intermediate the two resistances 444 and 440 is connected through tie line 448 to line 520 and provides a voltage supply for the transistors. Collector electrode 446 of transistor 22 is directly connected to base 452 of the transistor 24. The interconnecting line is connected to ground through bypass condenser 450. The emitter electrode 454 of transistor 22 is connected to ground through biasing resistor 456 and through limiting resistor 458 to tie line 448. As previously described, base 260 of the first stage of the trigger amplifier is connected to line 256 which extends to the last IF coupling section and to the pulse developing section.

The sensitive control relay 26, as previously mentioned, actuates two armatures 30 and 32 which in turn control the energization of the relay coil 424, which actuates the multi-pole multi-position switch 27 and cocking relay 490. Armature 30 oscillates between two fixed contacts 460 and 462 and is itself grounded. Contact 460 is connected through line 464 to the remaining terminal of operating coil 424 of the multi-pole control switch 27 and also through a limiting resistance 466 and line 468 to the collector electrode 470 of the automatic gain control transistor amplifier including transistor 472. Stationary contact 462 of the relay 26 is, on the other hand, connected through line 474 to line 72 and one terminal of a condenser 476. The opposite terminal of the condenser 476 is connected to line 78 and to one terminal of a resistance 478. Resistor 478 is likewise connected through line 480 with stationary contact 482 cooperating with movable armature C of the multi-pole multi-position switch 27. A second stationary contact 484 associated with movable armature C is grounded. Movable armature C is in turn connected through line 486 to a resistor-condenser network associated with secondary winding 242 of the last IF transformer.

Returning to the control relay 26 the second movable armature 32 is connected directly to line 488 which extends to one terminal of a solenoid winding 490. This solenoid is used for actuating the means which supports the variable tuning means and whose operation will be described. The other terminal of the winding 490 is connected through lines 492 and 494 to one end of a choke coil 496, the opposite terminal of which is connected to an on-off switch 498 controlling the power supply. Movable armature 32 is adapted to engage stationary contact 500 which is connected through line 502 to a movable switch arm 504 which forms part of a limit switch actuated by movement of the tuner member itself. This portion of the system is provided to move the tuning mechanism back to its opposite limit position when it has reached one extreme. Two solenoids are provided, one to independently move the tuning mechanism and the second to repower the power spring for the tuning mechanism independently. The reason for the two solenoids is that the carriage carrying the tuning mechanism must be independently movable aside from the spring loaded power means since it is proposed to also have the carriage movable by preset mechanical push button controls of the type described in Patent 2,494,008 issued on an invention of B. A. Schwarz, January 10, 1950 entitled Radio Tuning Device. Therefore while the solenoid 490 is adapted to physically move the carriage carrying the tuning means or the so-called treadle bar connected thereto, solenoid 506 on the other hand is adapted to independently load the spring or power driving mechanism at any time that it becomes substantially discharged.

The coil of the solenoid 506 has one terminal connected directly to supply line 494 and the other terminal connected to two movable switch arms 508 and 510. Switch arm 508 is a limit switch adapted to be actuated by the charge on the power driving spring and to close when the spring is substantially discharged, being opened again upon the movement of the actuating solenoid 506 to the opposite limit of movement. The second movable switch armature 510 connected to the coil 506 is actuated by energization of the solenoid 490. Thus when switch 504 closes to energize the solenoid 490 and move the tuning carriage to one extreme, the solenoid 506 is also energized to charge the driving power spring. However, if the power spring becomes discharged and the carriage has not called for movement to its other limit position, the spring may be powered independently by closure of the switch 508 alone.

The multi-pole multi-position control switch 27 actuated by relay coil 424 consists of four armatures A, B, C and D. These are all simultaneously moved as indicated by the dashed line interconnecting the same and are pulled to the left by energization of the relay coil 424. This is the position which the switch assumes when the radio receiver is tuning or searching. The multiple armatures A through D are spring biased to the opposite position by spring 512 which biases these armatures toward the right. This is the position assumed during that time that the receiver is on station. The connections in the circuit for stationary contacts 332 and 258 which are spaced contacts engageable by a movable arm D which is grounded, have been previously described. Likewise arm C has been described as being connected to a signal developing section and it oscillates between two fixed stationary contacts 484 and 482 which have been described. Oscillatory arm B is connected to ground through condenser 514 and also through resistance 516 to power line 520 and to line 518 extending to the supply line 494. A bypass condenser 521 is provided between line 518 and ground. Line 520 is also connected with one of the terminals on the plug portion 522 which is adapted to cooperate with the mating plug half 350. Movable armature B oscillates between fixed contacts 266 and 524. The connection to stationary contact 266 has been described. Contact 524, on the other hand, is connected through resistor 526 to line 528 which extends to that same signal developing section connected to line 486. Lastly, armature A oscillates between two fixed contacts 530 and 532. Contact 530 is connected through line 534 to the emitter electrode 268 of the detector transistor 14. Stationary contact 532 is connected directly to base electrode 536 of the transistor 472 for amplifying the automatic gain control signal. Armature A itself is connected through line 538 with a point in the signal developing section intermediate resistors 540 and 542 connected in series to one terminal of the secondary winding 242 of the last intermediate frequency transformer. A condenser 544 is connected in shunt across the two resistors 540 and 542. A third bridge resistance 546 is connected between line 486 and the remaining terminal of the resistance 542. Line 528 is likewise connected to this same point. The lower terminal of the secondary 242 is connected through line 548 to a rectifier 550 and thence through line 552 to line 486. Line 552 is connected to ground through bypass condenser 554.

The radio receiving system disclosed in Figs. 1, 1*a* and 1*b* is mounted in a casing together with a mechanical push-pull lock-up tuner as previously described. By the use of this tuning means, depression on any button will immediately bring the movable tuning means to a preset index and tune the receiver to a desired station for reception, the signal seeking and manual portions being disconnected at this time through a clutch. The tuning means, as previously mentioned, consists of three comminuted cores 40, 62 and 128, all commonly mounted on a movable carriage and simultaneously moved for tuning. As well as being indexed to particular preset desired stations this receiver is provided with signal seeking tuning indexing means which will be described. The signal seeking tuning means consists of a spring loaded means connected to the tuning means and adapted to move the tuning means in one direction over the band. When the tuning carriage has reached one limit of travel, a cocking solenoid 490 is energized to pull the carriage to the opposite extremity of travel, load the spring and when it reaches the opposite limit point, deenergize the solenoid. Clutch means are provided whereby the power driving means and the mechanical indexed means are disconnected when the mechanical push buttons are actuated. In the present instance, separate solenoids are provided for moving the carriage upon which the tuning means are mounted and for loading the spring.

The signal entering the receiver is amplified through an RF amplifier 2, mixed with a local oscillation in a mixer stage including transistor 4 and further amplified by passage through three IF amplifier stages including transistors 8, 10 and 12. The last IF stage as described in the body of the specification is designed for much heavier current flow than any of the others so that it may properly supply signals at its output. The primary 222 of the last IF transformer is capacitatively coupled to secondary 244 and a signal is fed to the detector from secondary 244 for detection for the audio output. Primary 222 has a tickler coil 242 in which voltages are developed upon the tuning in of a signal, which tickler coil is also connected to a rectifier to provide certain control signals both for signal seeking stopping and for automatic gain control. The receiver is controlled by two main relays 26 and 27. Relay 26 may be defined as a sensitive control relay and relay 27 is the multi-position, multi-pole relay which was previously mentioned. The stopping signals are derived in a similar manner to those previously provided in vacuum tube sets. The stopping signal which is applied to the two-stage indexing amplifier consists of three different signals. One is a constant restraining voltage present at all times, the second is a variable restraining voltage whose value depends upon the amplitude of the incoming signal and a third is the output voltage of the detector which is poled oppositely to the first two mentioned. Transistor 22 is of the NPN type and the transistor 24 is a PNP. When the receiver is scanning or tuning, transistor 24 is conducting and a sufficient amount of current is passing through relay coil 28 to cause it to maintain its armatures 30 and 32 in their upper position. This coil 28 also maintains a mechanical detent 31 out of the path of moving parts 33 of the drive mechanism including motive means diagrammatically indicated at 35 so that it may scan. At this time also, transistor 22 is conducting and maintains a sufficient voltage on the base 452 of transistor 24 to keep that in conductive condition. Relay coil 424 of relay 27 is likewise energized and maintains the armatures A, B, C and D in lefthand or search position. In this position, voltage is supplied to resistor 546 from the following circuit to provide a fixed constant bias; from main power input X through switch 498, choke coil 496, line 494, line 518, limiting resistor 516, armature B of relay 27, stationary contact 524, resistor 526, line 528, bias resistor 546 through line 486 to armature C, stationary contact 484 to ground. This provide a definite fixed positive bias or drop across resistor 546 which voltage, when no signal is received by the set, is applied through resistor 542, line 538, armature A of relay 27, contact 530, and line 534 to the emitter 268 of the detector transistor 14 applying this positive bias voltage to the top of the voltage divider upon which the signal voltage is developed. This provides a fixed restraining voltage in the trigger circuit. There is also a variable positive restraining voltage developed as the receiver is tuned into a station so that the tuning means will stop at substantially the center or peak of the resonance curve regardless of the strength of the incoming signal as long as it is above a threshold value. This voltage is obtained originally from the primary winding 222 which has a double humped response curve such as described in the patent to Guyton 2,652,486 issued September 15, 1953. This patent describes in detail the development of the restraining and trigger voltages in a similar control circuit and illustrates the shape of the double humped restraining voltage to center the indexing stopping pulse. The signal from the primary is taken off by a tickler winding 242 wound over the primary so that the induced signal in that winding is a duplicate of that in the primary. That variable restraining voltage is developed across resistance 542 by the resonant envelope in the tickler winding 242 as the station is tuned in. Diode 550 rectifies the voltage in the circuit of tickler secondary 242 to develop it across resistance 542. It is of the same polarity as the fixed bias across resistor 546 and therefore introduces a further positive voltage restraining action across resistors 272, 274 and 276.

As the set reaches resonance, a detected signal is rectified by transistor 14 acting as a diode, because voltage has been removed from its collector. This develops a negative voltage on the emitter electrode 268 which is opposed to both of the permanent and variable restraining voltages appearing at this point and when this detected voltage exceeds the sum of restraining voltages, a stopping pulse is developed. The polarity of this voltage is determined by polar connections of diode 248 and NPN transistor 14. This stopping voltage is developed across resistances 272, 274 and 276 and is applied through line 256 to the base 260. When, therefore, the detected signal exceeds the restraining voltage, the voltage on the base 260 is driven negative to cut off the collector-emitter flow through transistor 22. This reduces the voltage across resistor 444, increasing the voltage on the collector 446 which is directly connected to the base 452 of transistor 24. Since 24 is a PNP transistor, the reduction in voltage at the base will cause a diminishing of current flow thru this transistor and the relay coil 28 will drop its armatures 30 and 32 to cause switching simultaneously dropping a mechanical detent into the scanning means to index the tuner. When armature 30 drops, breaking contact with contact 460, relay coil 424 is deenergized causing it to drop its contacts and move all of the armatures A, B, C and D to the alternate position for listening. Movement of the arm 326 over its alternate contacts adjusts the tone of the receiver during listening.

In order to assist in a better understanding of the function of the multi-pole, multi-position relay switch 27, this set also includes an automatic gain control which has a one-stage amplifier therein. The gain control derives its voltage from the tickler coil circuit including coil 242, associated with the last IF transformer. The automatic gain control voltage is developed across resistor 542 which voltage is applied to line 538 and thence to the base 536 of the automatic gain control transistor amplifier 472 through armature A. The amplified signal for gain control is then applied from the emitter 471 through resistor 473 to line 480, and thence through resistor 478 to the automatic gain control line 78. Bypass capacitor 475 is connected to the point intermediate resistor 473 and resistor 478. Gain control is applied to the RF converter and first IF stages from line 78. In the present instance, a diode rectifier 80 is connected between line 78 and the RF amplifier 2 to delay the application of gain control voltage to the first RF stage, to that applied to the other stages with increasing signal. This is provided as means for improving the signal to noise ratio of the receiver without deterioration of overload characteristics. It is believed that it would assist in understanding the operation of the current receiver to set forth specifically the function and operation of each of the armatures A, B, C and D of the control relay 27.

Each armature has one position during the searching cycle of the receiver and another during the listening cycles.

(1) Armature A.—In left-hand search position, armature A completes the circuit between the tickler coil circuit and the emitter of the detector 14 to apply restraining voltage to the detector load resistor circuit.

In the right-hand position, armature A completes a circuit from the same tickler coil circuit to the amplifier for the gain control circuit.

(2) Armature B.—When armature B is in its left-hand or search position it completes a circuit from the power supply through a limiting resistor 526 to the permanent bias resistor 546 as previously described.

When armature B is in its right-hand or listening position, it completes a circuit from the power supply to the collector 262 of the detector for the application of voltage thereto during the listening cycle.

(3) Armature C.—When armature C is in its left-hand position or searching position, it grounds one side of the tickler coil circuit to complete the same.

When armature C is in its right-hand position or listening position it connects the same point in the tickler circuit to the emitter circuit of the AGC amplifier 472.

(4) Lastly, armature D, when in its left-hand or search position completes a circuit to ground for one side of the feedback coil 310.

When armature D is in its right-hand position or listening position it provides a current return for the detecting secondary 244.

In describing the operation of the receiver, assuming that switch 498 has been closed to provide suitable power supply and the operator desires to signal tune the radio, he momentarily closes switch 406. The closure of this switch energizes coil 28 of the sensitive relay 26 through the following circuit. Power supply X, switch 498, choke 496, line 494, line 518, line 520, switch arm 420, contact 408, line 410, relay coil 28 to ground. The energization of coil 28 will cause it to attract its armatures 30 and 32, and at the same time remove the mechanical detent from the path of the tuner drive and the tuner therefore starts to scan the band. Simultaneously also relay coil 424 will be energized to cause its armatures A, B, C and D to move from the right-hand to the left-hand position. The energizing circuit for coil 424 is as follows: The same supply circuit to line 520 and then through coil 424, line 464, contact 460, armature 30 to ground. The movement of armatures A, B, C and D (1) applies a restraining voltage to the triggering amplifying circuit (2) applies a supply voltage for the permanent bias or fixed bias (3) provides a grounding circuit for the fixed bias developing circuit, and (4) grounds one side of the tickler coil for muting purposes. As the carriage mounting the tuning means moves to tune across the band, the restraining voltage developed across resistance 546 will maintain transistor 22 conductive to in turn maintain transistor 24 conductive so that the operator may remove pressure from the switch 406 and the relay coil 28 will remain energized through current flow through transistor 24. This circuit is as follows: From supply line 520 through line 448, resistor 440, emitter 438, collector 412, relay coil 28 to ground. As long as the set is not tuned into any station this circuit will remain energized and the sensitive relay energized. As soon as a station is approached an additional restraining voltage is developed across resistor 542 in series with the tickler coil which will increase as the set comes into station. It aids the fixed bias. At a point adjacent the resonance, however, the detected signal detected by transistor 14 will oppose and overcome these restraining voltages and apply a control pulse to base 260 to cause transistor 22 to reduce its conductivity. This also reduces the conductivity through transistor 24 which is of the opposite characteristic and causes relay 26 to drop, indexing on station.

As before mentioned, if movement of the carriage by the power source reaches one extreme position of movement, means are automatically provided to return it to the opposite extreme position so that it can then continue scanning in the same direction. In this instance, this means is the solenoid 490 which is energized by mechanical limit switch means 504 on the device; when the carriage reaches such a limit position, it closes switch 504 which completes an energizing circuit for the solenoid 490 which quickly pulls the carriage back to its other position. This energizing circuit is as follows: From the power source, line 494, line 492, solenoid coil 490, line 488, armature 32 of relay 26, contact 500, line 502 to limit switch 504 to ground. It will be obvious that there is included in this energizing circuit for the solenoid 490, not only the limit switch 504, but in addition an interlocking switch 32—500. Thus even though the carriage reaches one end of its travel through manual or mechanical means, the recocking solenoid will not be energized unless the receiver is under signal seeking control.

Since it is possible to move the tuning carriage without in any way varying the spring load on the driving spring, there is also provided a separate cocking or loading solenoid 506 for loading the spring drive. This solenoid is energized upon the closure of certain limit switch means 508 which are actuated by means connected to the spring drive which assumes a given position as the spring is discharged. If the spring is discharged and closes switch 508, solenoid 506 is energized through an obvious circuit to quickly reload the spring and simultaneously de-energize the solenoid through opening said same limit switch. It is to be further noted that there is in parallel with the limit switch 508, a solenoid actuated switch 510 operated by solenoid 490 thus each time the carriage solenoid is actuated, the spring loading solenoid is likewise actuated to tend to maintain the spring loaded even though it still retains some force and has not specifically called for such loading.

We claim:

1. In radio receiving means, amplifying means having an input circuit to which radiant wave energy is applied and an output circuit, means for tuning the amplifying means over a predetermined band of frequency, power means connected to said means for tuning the amplifying means, detector means whose input capacity changes with changes in signal level connected to the output circuit of the amplifying means, resistance means connected to the detector means and across which voltages are developed by received radiant wave energy, diode means in circuit between the amplifying means and the detector means to stabilize operation of the latter by minimizing the effects of capacity change on said amplifying means and indexing stopping means controlling the power means and connected to the resistance means to stop the means for tuning the amplifying means when a voltage is developed across the resistance means by the detector means.

2. In radio receiving means, amplifying means having an input circuit to which radiant wave energy is applied and an output circuit, means for tuning the amplifying means over a predetermined band of frequency, power means connected to said means for tuning the amplifying means, detector means connected to the output circuit of the amplifying means, resistance means connected to the detector means and across which voltages are developed by received radiant wave energy, a multiple stage trigger circuit having an input and an output circuit and including semi-conductor devices of opposite characteristics connected in cascade and whose input circuit is connected to the resistance means and which is controlled by the voltages developed thereacross, relay indexing means associated with the means for tuning the amplifying means connected to the output circuit of the trigger circuit to index the means for tuning the amplifying means dependent upon the voltages developed across the resistance means and energy absorbing means connected to said output circuit of the trigger circuit to protect the semi-conductor devices there.

3. In radio receiving means, a high frequency amplifying section having a tuned output section to which incoming modulated signals are applied, a multi-electrode semi-conductor element having two of its electrodes connected across the output of the high frequency amplifying section to act as a detector whose capacity changes as the amplitude of the applied signal changes, means for applying a voltage to a remaining electrode of the semi-conductor element and rectifier means connected between the tuned output section of the high frequency amplifying section and one of the electrodes of the semi-conductor element to minimize the effect of the change in capacity and stabilize the operation of the same.

4. In radio receiving means, high frequency amplifying means to which a modulated high frequency signal is applied, means for tuning said amplifying means over a predetermined band of frequency, driving means for the means for tuning the amplifying means, relay control means operatively connected to the driving means for stopping the driving means on a desired station, detector means connected to the high frequency amplifying means, resistance means connected to the detector means and across which control voltages are developed by the detector means when signals are applied to the high frequency amplifying means, means connected to the resistance means for applying a fixed bias voltage to the resistance means of opposite polarity to the control voltage developed thereacross by the detector, means connected to the high frequency amplifying means and to the resistance means to apply a variable voltage of the same polarity as the fixed bias to the resistance means which increases as the amplifying means is tuned into a station and then decreases at station frequency and transistor amplifying means connected across the resistance means and to the control relay means so that the fixed bias provides sufficient current flow through the transistor amplifying means to maintain the control relay means energized and in one position but when the detected signal control voltage overcomes both the fixed and variable biased voltages, the transistor amplifying means will cut off causing the relay control means to move to another position and stop the tuning means.

5. In radio receiving means, amplifying means having an input circuit to which radiant energy signals are applied, and an output circuit, means for tuning the amplifying means over a predetermined band of frequencies, power means connected to said means for tuning the amplifying means to drive the same over the band, rectifier means connected to the output circuit of the amplifying means, resistance means connected to said rectifier means and across which restraining voltages are developed as the tuner is tuned into a station, a source of electrical power connected to said resistance means to provide a fixed restraining voltage thereacross, control relay means operatively associated with the power means to stop the same, indexing control means including transistor means connected to said resistance means and to the control relay means to determine the energization of the control relay means, and detecting means connected to the output circuit of the amplifying means and to the indexing means to develop an actuating signal in opposition to the fixed and variable restraining voltages applied to the transistor means to vary the conductivity thereof and cause actuation of the control relay means.

6. In radio receiving means, amplifying means having an input circuit to which radiant energy signals are applied, and an output circuit, means for tuning the amplifying means over a predetermined band of frequencies, power means connected to said means for tuning the amplifying means to drive the same over the band, rectifier means connected to the output circuit of the amplifying means, resistance means connected to said rectifier means and across which restraining voltages are developed as the tuner is tuned into a station, a source of electrical power connected to said resistance means to provide a fixed restraining voltage thereacross, detector means connected to the output circuit of the amplifying means, a second resistance means connected to the detector means across which actuating voltages are developed as the tuner is tuned into a station, said first-named resistance means being connected to said second resistance means so that the voltages developed in the first-named resistance means opposes those developed in the second resistance means, indexing stopping means for the tuner including transistor amplifying means having an input circuit connected to the second resistance means and controlled by the combined voltages developed thereacross by the rectifier means, source of electrical power and detector means to index the tuner on station.

7. In radio receiving means, amplifying means having an input circuit to which radiant wave energy is applied and an output circuit, means for tuning the amplifying means over a predetermined band of frequency, power means connected to said means for tuning the amplifying means to drive the same, semiconductor detector means connected to the output circuit of the amplifying means, resistance means connected to the detector means and across which voltages are developed upon the receipt of an incoming signal, indexing stopping means controlling said power means connected to the resistance means to index the means for tuning the amplifying means when a voltage is developed across the resistance means and a rectifier in series circuit between the output circuit of the amplifying means and the semiconductor detector so poled as to prevent reflecting capacity changes in the semiconductor detector back into the amplifying means to tend to de-tune the same thus producing inaccurate indexing of the indexing stopping means on a given transmitted frequency signal.

References Cited in the file of this patent

UNITED STATES PATENTS

| | | |
|---|---|---|
| 2,541,017 | Alexander | Feb. 13, 1951 |
| 2,585,640 | Everitt | Feb. 12, 1952 |
| 2,608,651 | Emmett | Aug. 26, 1952 |
| 2,652,486 | Guyton | Sept. 15, 1953 |
| 2,652,494 | Guyton | Sept. 15, 1953 |
| 2,709,748 | Goldsmith | May 31, 1955 |
| 2,757,052 | MacDonald | Aug. 14, 1956 |
| 2,764,675 | Guyton | Sept. 25, 1956 |
| 2,776,375 | Keiper | Jan. 1, 1957 |
| 2,802,938 | Herzog | Aug. 13, 1957 |

OTHER REFERENCES

Book: "Transistors Theory and Practice" by Rufus P. Turner, Gernsback Library No. 51, 1954.

"A Discussion on the Design Problems Encountered in the Development of a Transistorized Radio Receiver" by Worcester in "IRE Transactions on Broadcast and Television Receivers," April, 1956, pages 6–9.